Nov. 20, 1956  R. R. HENNIG  2,771,153
FILTER APPARATUS
Filed April 20, 1955  3 Sheets-Sheet 1
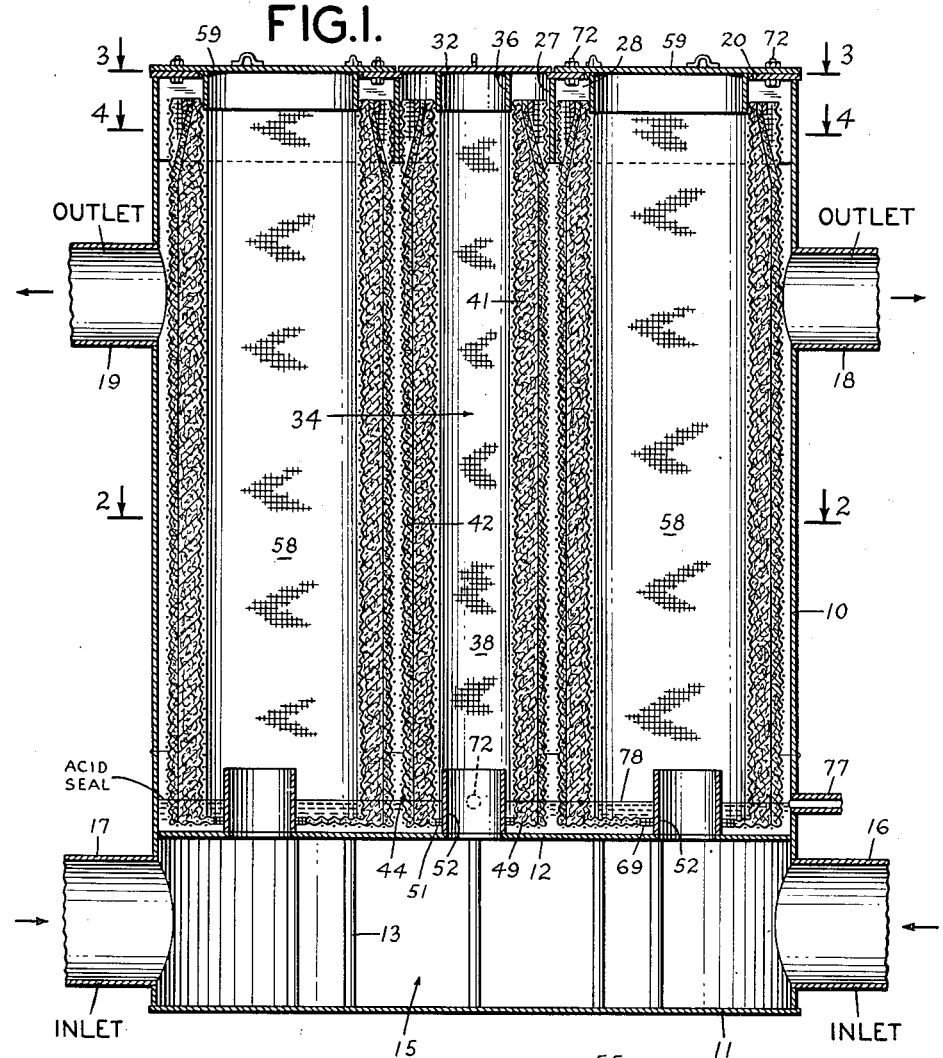
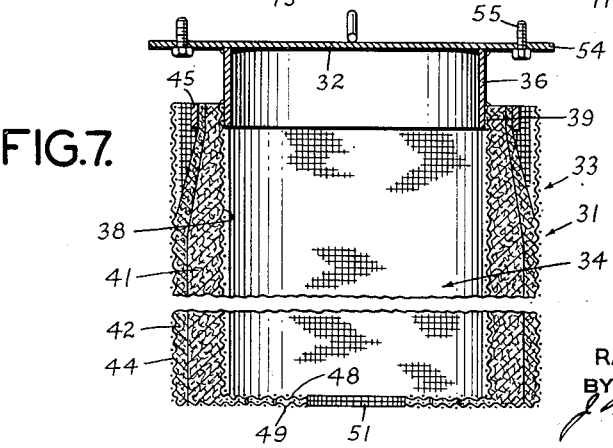
INVENTOR
RALPH R. HENNIG
BY
ATTORNEY Nov. 20, 1956

R. R. HENNIG 2,771,153

FILTER APPARATUS

Filed April 20, 1955

INVENTOR
RALPH R. HENNIG
BY
ATTORNEY

Nov. 20, 1956 R. R. HENNIG 2,771,153
FILTER APPARATUS
Filed April 20, 1955 3 Sheets-Sheet 3
FIG.6.
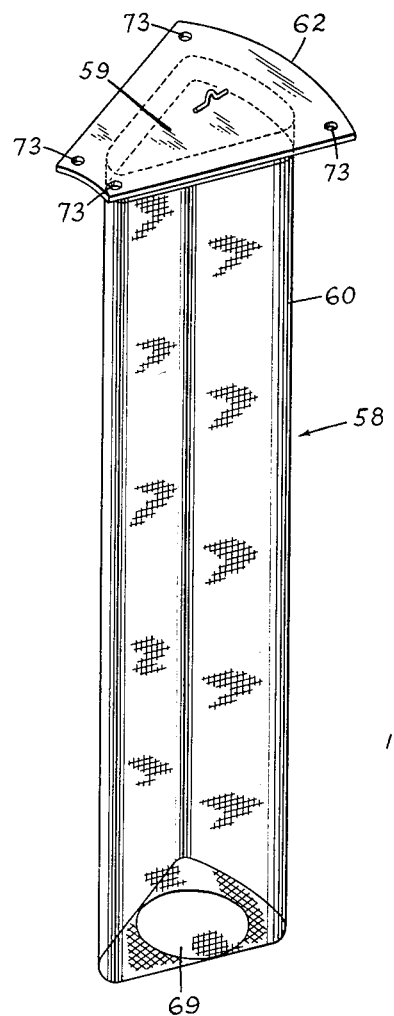
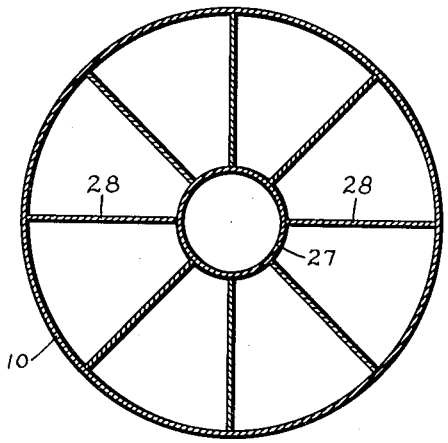
FIG.4.
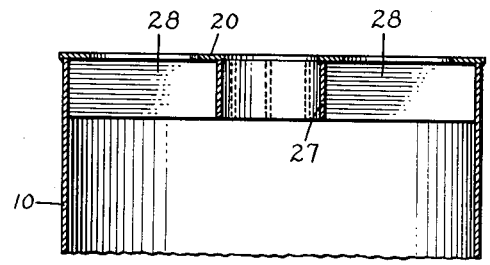
FIG.5.
INVENTOR
RALPH R. HENNIG
BY
ATTORNEY

United States Patent Office 2,771,153
Patented Nov. 20, 1956

2,771,153

FILTER APPARATUS

Ralph R. Hennig, New York, N. Y., assignor to Allied Chemical & Dye Corporation, New York, N. Y., a corporation of New York Application April 20, 1955, Serial No. 502,595

6 Claims. (Cl. 183—46)

This invention relates to apparatus for separating entrained particles from a gas stream containing the same, and is directed more specifically to filters for mechanically removing small particles of liquid from a stream of gas in which such particles are dispersed.

Many industrial processes involve the disposal, usually to atmosphere, of large volumes of gas containing finely divided liquid particles. Such particles or mist may be more or less chemically active or inherently noxious, and may constitute the basis of serious nuisance in the surrounding locality. An example of such a gas is the tail gas of plant for making sulfuric acid by the contact process. In such an operation, notwithstanding best known plant practice and rigid process control, stack gases may intermittently contain small but potentially objectionable quantities of so-called "acid mist" which is dispersed sulfuric acid particles so fine as to probably approximate "aerosol" form. To correct stack exit conditions, use of electrostatic precipitators has been proposed, but except for special circumstances, costs of this type of separator are prohibitive. Various mechanical extraction devices have been suggested. However, end results have been unsatisfactory because of such factors as high installation costs, high pressure drop, cumbersomeness, and large overall size per unit of effective filtering area.

A major object of the present invention lies in the provision of gas filtering apparatus, suitable for effective use in operations such as outlined above, which apparatus is characterized principally by design and construction which greatly improves available filtration area per overall size of a given filtering apparatus unit. Further objects include provision of filter apparatus which effectuates only a small pressure drop, affords ready accessibility for filter element inspection repair and replacement, and permits construction which is lightweight and markedly small overall per unit of filtering area.

Other objects and advantages of the invention will be apparent from the following description taken in connection with the accompanying drawing, in which Figure 1 is a vertical section of the apparatus taken on the line 1—1 of Fig. 2;

Fig. 4 is a reduced-scale horizontal section along the line 4—4 of Fig. 1 with all filter units removed;

Fig. 5 is a reduced-scale vertical section of the top portion of the apparatus with all filter units removed, taken along the line 5—5 of Fig. 3;

Fig. 6 is a perspective view of part of a filter unit which has a sectoral horizontal cross-section; and Fig. 7 is an enlarged detail section taken on the vertical axis of a cylindrical central filter unit.

Figure 3:
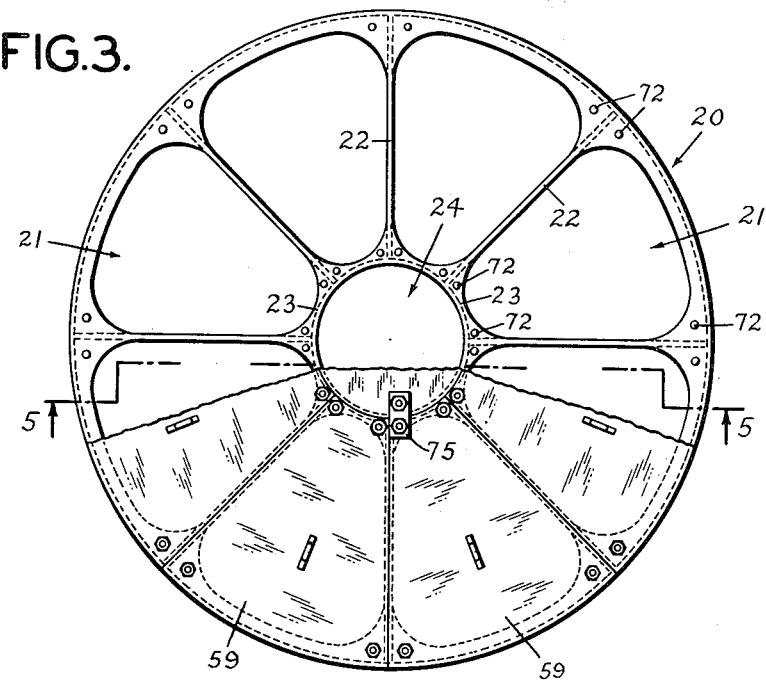
Fig. 3 is a top view with certain of the filter units removed to show the construction of the top end of an outer casing.

Referring particularly to Fig. 1 of the drawing, in the embodiment exemplified, the filtering apparatus of the invention comprises a vertically disposed cylindrical shell 10, made of sheet steel or other material suitable for the use intended, provided with a circular base 11 peripherally welded to the lower end of the shell. Spaced upwardly from base 11 is a circular metallic plate 12 similarly circumferentially welded to shell 10, and centrally supported by vertical studs 13. Sheet 12 and base 11, together with the intermediate portion of the lower end of shell 10, form a gas inlet header or manifold 15 which is provided with gas inlet conduits 16 and 17. Near the upper end, shell 10 has attached thereto conduits 18 and 19 which, in preferred operation of the apparatus, function as gas outlets. Circular plate 12 and that portion of shell 10 above plate 12 constitute gas impermeable side walls and bottom wall of a main gas chamber casing having a top wall, construction of which is best shown in the plan of Fig. 3.

The top wall, generally indicated by 20, Fig. 3, is a circular metallic sheet peripherally welded or otherwise attached to the upper circumferential edge of shell 10 in gas-tight relation. Wall 20 is formed with a multiplicity, e. g. 8 in the embodiment shown, of cut-outs 21 which are sectoral in horizontal plan and positioned so that the arcual portions thereof lie adjacent the shell, and the apices thereof are directed toward the vertical axis of the apparatus. The radially disposed spacing webs 22 merge in an annular web 23 the inner edge of which provides, in the particular embodiment of the invention shown, a circular cut-out or opening 24.

To make provision for adequate support of top 20 and the weight of the subsequently to be described filter units, the apparatus includes the top support structure illustrated in Figs. 4 and 5, Fig. 5 shows a depending annulus 27 of suitable vertical dimension and having an inner diameter slightly larger than that of circular opening 24 (Fig. 3). Attached to and projecting radially from annulus 27 are vertically disposed webs 28, Fig. 4, which in plan are positioned correspondingly to webs 22 of the casing cover 20. Webs 28 are welded or otherwise fixedly attached at their vertical outer ends to the inner side of the upper end of shell 10. In the embodiment shown, the upper edges of annulus 27 and webs 28 are preferably welded to the contiguous underside of casing cover 20. The construction described affords rigid support for a multiplicity of filter units, and makes possible maximum openwork areas in casing top 20 for insertion of filter units.

An important aspect of the invention lies in provision of apparatus affording high ratio of filtering area to cubic unit of overall gas filter chamber. A major factor involved in accomplishment of this result is the interdependent conformations of the filter casing and of filter units employed. Preferably, the filter casing is circular in horizontal cross-section as shown. Each filter unit is of inverted cup-like general form, and in the particular apparatus exemplified, peripheral units are sectoral in horizontal cross-section, and a center unit is circular in horizontal cross-section.

Fig. 7 illustrates in vertical section the construction of a center or axial filter unit 31 which is preferably circular in horizontal section. This unit comprises a top wall 32 and side walls, indicated generally at 33, which, when the filter unit is in place in the casing and suitable for operation, form an interiorly disposed gas chamber 34. The walls of the filter unit are constructed and arranged such that at least a portion thereof is made of material permeable to gas and substantially impermeable to liquid or other particles to be separated from gas. In a typical construction, filter unit top wall 32 is a steel plate having depending therefrom an annular sleeve 36 of suitable axial length. The upper circumference of an inner filtering medium supporting screen 38 telescopes over and may be spot-welded to the lower end of sleeve 36 as at 39. Enveloping screen 38 is an inner blanket of filtering material 41, e. g. glass wool. In turn, there is wrapped around the cylindrical outside suface of filtering material layer 41 a second or outer layer of filtering material 42, e. g. preferably glass wool of grade considerably finer than that of blanket 41. Filter layers 41 and 42 are held against the inner screen 38 by an encircling cylindrically shaped outer screen 44. As shown in Fig. 7, the upper ends of the filtering material blankets are compressed and clamped against the exterior of the lower end of sleeve 36 by means of metallic annulus or strap 45 of diameter substantially less than the diameter of the upper end of outer screen 44.

Particularly as shown in Fig. 7, supporting screens 38 and 44 extend downwardly and at the bottom of the unit are inwardly turned to form screen flanges 48 and 49 which may be suitably attached to each other to provide suitable rigidity to the lower end of the filter unit. In the filter unit construction as shown, it is noted that there is no filtering medium between screen flanges 48 and 49, investigations indicating that to secure optimum liquid drainage of the filtering material, the filtering units should be open-bottomed. Annular screen flanges 48 and 49 terminate in such fashion as to form a circular opening 51 of diameter sufficiently large to permit reception of a vertically disposed cylindrical sleeve 52 (Fig. 1) which constitutes a conduit affording gas communication between inlet gas manifold 15 and the interiorly disposed gas chamber 34 of filter unit 31, Figs. 1 and 7.

The maximum horizontal cross-sectional dimensions of the filtering portion of filtering unit of Fig. 7 are slightly less than those of opening 24 (Fig. 3) in casing cover plate 20, i. e. the maximum diameter of the gas filter section of unit 31 is sufficiently less than the diameter of circular opening 24 to permit ready insertability of the unit into such opening. The overall axial dimension of unit 31 is such that, when the unit is in place as illustrated in Fig. 1, the lower periphery of the unit side walls and the casing bottom 12 are maintained in closely adjacent or substantially contiguous but non-fixed relation. In Fig. 7, the outwardly projecting annular flange 54 of unit cover 32 in conjunction with the fixed thereto stud bolts 55 afford means, as will hereinafter appear, for attaching the unit 31 to the casing top in gas-tight relation. It will be seen from Fig. 1 that, when unit 31 is operatively in place in the casing, the exterior filtering walls of unit 31 form with the inside surface of the casing a peripherally disposed gas chamber which is in gas communication with outlets 18 and 19.

Figure 2:
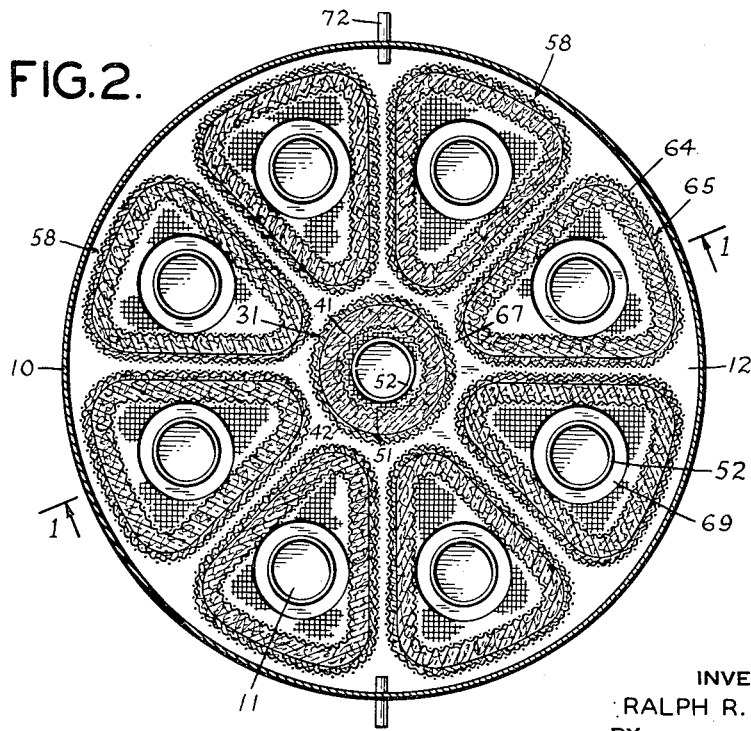
Fig. 2 is a horizontal section along the line 2—2 of Fig. 1, showing plan arrangement of filter units within the apparatus.

In horizontal cross-section, the peripheral filter unit 58, shown in perspective in Fig. 6, is sectoral. Fig. 6 shows only the gas impermeable top wall 59, an inner screen 60 (corresponding with inner screen 38 of Fig. 7) and the outwardly projecting attaching flange 62 which, as in Fig. 7, is coextensive with top 59. Radial dimensions of unit 58 are such that, when the unit is in place in the casing, the vertical arcual wall 64 (Fig. 2) is adjacent the inner wall of shell 10 as illustrated at 65, and the apex of the converging outer screen walls closely approaches the outer screen of center unit 31 as shown at 67. The maximum arcual length (in horizontal plane) of the gas permeable section of unit 58 is such that the radial side walls of one sectoral unit are positioned as closely as feasible to the radial walls of an adjacent sectoral unit as is clearly illustrated in Fig. 2. Overall dimensions of a horizontal cross-section of the screen portion of a unit 58 are slightly less than the corresponding dimensions of opening 21 (Fig. 3) in the casing top wall 20 to permit ready insertability of the peripheral filter unit into the shell. Each sectoral unit is provided at the bottom with a circular opening 69 (corresponding with opening 51 of unit 31 of Fig. 7) which is adapted to receive an upwardly projecting gas inlet conduit 52 (Fig. 1).

One expedient for fastening a filter unit to the casing top wall 20 in gas-tight relation will be apparent from consideration of Figs. 3 and 6. At suitable points about the periphery of an opening 21 (Fig. 3), there are provided e. g. four or more upstanding stud bolts 72 which are fixed to casing top wall 20 and adapted to register with correspondingly positioned tap holes 73 in the outwardly projecting flange 62 of a filter unit 58. When such a unit is inserted into opening 21 and placed in operative position, the flange 62 is then clamped to the upper side of the casing top as by nuts threaded onto upstanding studs 72. With regard to attachment of axial cylindrical filter unit 31 to the casing top 20 in gas-tight relation, to avoid the necessity of separate tap holes in the limited available area around opening 24 (Fig. 3), it is satisfactory to connect the stud bolts 55 of the central unit 31 to two or more of the sectoral filter units as by means of straps 75 Fig. 3.

A further feature of the invention comprises means for forming a liquid gas-tight seal between the casing bottom and the lower peripheries of the several filter unit side walls. For this purpose, shell 10 is provided with one or more liquid overflow discharge pipes 77 Fig. 1. The vertical positioning of pipes 77 and the vertical length of gas inlet conduits 52 are relatively chosen so as to maintain, during operation, on casing bottom 12 a liquid pool 78 of depth sufficient, for all pressures of operation, to maintain a liquid gas-tight seal about the lower end of each filter unit. While liquid for such seal may be introduced from extraneous sources by suitable piping, in normal operation, liquid particles filtered out of the gas stream and collected in pool 78 constitute more than enough liquid to maintain the seal described.

In operation, the gas stream having liquid particles entrained therein enters the inlet manifold 15 from pipes 16 and 17, and is admitted into the interiorly disposed gas chambers of the several filter units thru the respective gas conduits 52 passing thru the casing bottom wall 12. The gas then flows radially outwardly thru the side walls of the filter units, passing in succession thru the inner screen 38, coarse inner blanket of glass wool 41, outer blanket of finer glass wool 42, outer screen 44, and into the peripherally disposed gas chamber which surrounds all filter units and communicates with gas outlets 18 and 19. The particular filtering material employed and whether or not used in single or multiple layers of graduated porosity depend upon the particular operation at hand. However, multiple layers of successively finer (in the direction of gas flow) grades of glass wool are preferred. For example, to effect removal of the familiar so-called acid mist from the stack gas of a contact sulfuric acid plant, it is preferred to utilize an inner blanket 41 of a 14 micron average fiber diameter glass mat (commercially available as Owens-Corning TWF) of about 4 to 6 inches thick, and an outer layer of a 1.0–1.3 micron average fiber diameter glass mat (commercially available as Owens-Corning PF–105) of about 0.5 to 2.0 inches thick.

When operating as described and particularly when employing the above indicated glass wool filtering material, larger droplets of liquid ranging from about 1.0 micron and upward in diameter adhere to the coarse fibers of the inner layer of glass wool 41, and the droplets coalesce on the fibers and drain down into liquid pool 78. The outer layer of finer glass wool 42 serves to clean up the gas stream, removing smaller droplets or particles down to less than about 0.8 micron in diameter. Particles caught by outer layer 41 likewise drain down into pool 78. Excess accumulated liquid is discharged from the apparatus thru draw-off pipes 77. In this specification and appended claims the term "liquid particle" is intended to include all liquid phase material down to and including so-called "aerosol" size.

The invention apparatus may be operated under subor superatmospheric pressures, and at all temperatures in which the entrained liquid has a viscosity below about 100 centipoises. The particular embodiment of the invention described may be utilized to remove liquid droplets of size in the range of about 0.3 to 1000 microns in diameter on input concentrations up to about 1000 milligrams of dispersed liquid particles per cubic foot of incoming gas (NTP). Gas flow in the direction described, rather than the reverse, is preferred because with the gas outlet close to top of the casing, there is no substantial tendency for the exiting gas stream to entrain liquid particles from the pool 78 or from the vertical sides of the filter units. In the operation of one embodiment of the invention, using a filter casing about 9'–9" in diameter and about 12' high, constructed substantially in accordance with Figs. 1 and 2, effective internal filter area totaled 735 square feet, i. e. about 0.82 square feet of filtering area per cubic foot content of the casing. When passing 10,000 C. F. M. (NTP) of gas initially containing 60 milligrams of sulfuric acid mist per cubic foot of gas (NTP), total pressure drop across the apparatus was about 1.5 inches of water, and about 98.5 weight percent of the mist was removed.

Advantages afforded by the invention are largely apparent from the foregoing description. The provision of large filtering area per overall apparatus unit is evident from inspection of Figs. 1 and 2 and the above example. Further, the velocity of a given quantity of gas passing through a separation area is inversely proportional to that area. It follows that the larger the separation area, the smaller will be the pressure drop for a given quantity of gas. Hence, in view of the large filter area, it is apparent that pressure drop between inlets 16 and 17 and outlets 18 and 19 is correspondingly small as indicated above. Moreover, accessibility of operative parts of the apparatus is evident. Filter units may be removed individually or collectively for inspection, repair or replacement, and most of the units are interchangeable. In addition to having minimum overall dimensions, the apparatus of the invention has the advantage of having a low total weight. Glass wool and screening are light-weight materials, and because of cylindrical shell construction, low gauge sheet metal may be used without sacrificing rigidity or efficiency. This light weight factor facilitates overhead use of the equipment without the expense of too heavy and expensive support facilities.

I claim:

1. Apparatus for separating entrained liquid particles from a gas stream containing the same, said apparatus comprising a casing formed of gas impermeable material and having side walls, a bottom wall, and a top wall having an opening therein; an open-bottomed filter unit comprising top and side walls adapted to form an interiorly disposed gas chamber, said top being gas impermeable and at least a portion of said unit walls being permeable to gas and substantially impermeable to liquid particles, said unit having (a) cross-sectional dimensions less than those of said casing and of said casing top wall opening whereby said unit is readily insertable in and removable from said casing and is adapted to form with the interior walls thereof a peripherally disposed gas chamber and (b) longitudinal dimensions sufficient so that the lower periphery of said unit side walls and said casing bottom are adapted to be maintained in substantially contiguous but non-fixed relation, means for attaching the top of said unit to said casing top in gas-tight relation, means for forming a liquid gas-seal, comprising liquid particles coalesced and collected during operation, between said casing bottom and the lower periphery of said unit side walls, a gas conduit through said casing communicating with said interior gas chamber, and a gas conduit through said casing communicating with said peripheral gas chamber.

2. The apparatus of claim 1 wherein the means for attaching said unit to said casing top includes an annular flange projecting outwardly from the peripheral edge of the filter unit top wall and overlapping the edge of said casing top wall opening, and means for detachably connecting said flange to said top wall in gas-tight relation.

3. Apparatus for separating entrained liquid particles from a gas stream containing the same, said apparatus comprising a casing formed by a continuous circumferential metallic side wall, a metallic bottom wall and a metallic top wall having a plurality of sectorally-formed openings therein; a plurality of filter units of substantially sectoral cross-section, each comprising a metallic top and side walls formed of screen-supported glass wool adapted to form an interiorly disposed gas chamber, each of said units having (a) cross-sectional dimensions less than those of said casing and of the corresponding casing top wall opening whereby such unit is readily insertable in said casing and is adapted to form with the interior walls thereof a peripherally disposed gas chamber and (b) vertical dimensions sufficient so that the lower periphery of such unit side walls and said casing bottom are adapted to be maintained in substantially contiguous but non-fixed relation; means for attaching said units to said casing top in gas-tight relation with sectoral units deployed with their arcual side walls paralleling the circumferential casing side walls, a plurality of gas outlet conduits through said casing side wall communicating with said peripheral gas chamber; means for forming a liquid gas-seal between said casing bottom and the lower peripheries of said unit side walls including gas conduits communicating with each interior gas chamber and projecting vertically through the casing bottom, and a liquid draw-off positioned to maintain a pool of liquid in the bottom of the casing with a liquid level between the lower peripheries of the unit side walls and the top ends of the said gas conduits.

4. The apparatus of claim 3 which includes a filter unit correspondingly constructed as defined but having a circular cross-section and being axially disposed in such fashion that its circumference is closely approached by the apex edge of each sectoral unit.

5. The apparatus of claim 1 wherein the means for forming a liquid gas-seal between said casing bottom and the lower periphery of said unit side walls includes said gas conduit extending thru the casing bottom and projecting vertically a relatively short but appreciable distance into and opening into the bottom of the interior gas chamber, and a liquid draw-off positioned to maintain a pool of liquid in the bottom of the casing with a liquid level between the lower periphery of the unit side walls and the top end of the said gas conduit.

6. Apparatus for separating entrained liquid particles from a gas stream containing the same, said apparatus comprising a casing formed by a continuous circumferential metallic side wall, a metallic bottom wall and a metallic top wall having a plurality of sectorally-formed openings therein; a plurality of filter units of substantially sectoral cross-section, each comprising a metallic top and side walls formed of screen-supported glass wool adapted to form an interiorly disposed gas chamber, each of said units having (a) cross-sectional dimensions less than those of said casing and of the corresponding casing top wall opening whereby such unit is readily insertable in and removable from said casing and is adapted to form with the interior walls thereof a peripherally disposed gas chamber and (b) vertical dimensions sufficient so that the lower periphery of such unit side walls and said casing bottom are adapted to be maintained in substantially contiguous but non-fixed relation; means for attaching said units to said casing top in gas-tight relation with sectoral units deployed with their arcual side walls paralleling the circumferential casing side walls; means for forming a liquid gas-seal, comprising liquid particles coalesced and collected during operation, between said casing bottom and the lower peripheries of said unit side walls, gas conduit means thru said casing communicating with each of said interior gas chambers, and a gas conduit thru said casing communicating with said peripheral gas chamber.

References Cited in the file of this patent

UNITED STATES PATENTS 2,083,649    Heglar  ---------------- June 15, 1937
2,413,769    Kasten  ---------------- Jan. 7, 1947

FOREIGN PATENTS 252,054    Great Britain  ---------- May 11, 1926